US012583548B2

(12) United States Patent
    Pfau

(10) Patent No.: US 12,583,548 B2
(45) Date of Patent: Mar. 24, 2026

(54) CONTROLLER AND CONTROL METHOD FOR RIDER ASSISTANCE SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 18/557,419

(22) PCT Filed: Apr. 20, 2022

(86) PCT No.: PCT/IB2022/053668
    § 371 (c)(1),
    (2) Date: Oct. 26, 2023

(87) PCT Pub. No.: WO2022/229792
    PCT Pub. Date: Nov. 3, 2022

(65) Prior Publication Data
    US 2024/0208598 A1     Jun. 27, 2024

(30) Foreign Application Priority Data

Apr. 29, 2021    (JP) ................................. 2021-076946

(51) Int. Cl.
    *B62J 50/22*        (2020.01)
    *B60K 35/10*        (2024.01)
    *B60K 35/80*        (2024.01)
(52) U.S. Cl.
    CPC .............. *B62J 50/22* (2020.02); *B60K 35/10* (2024.01); *B60K 35/80* (2024.01)
(58) Field of Classification Search
    CPC ........... B62J 50/22; B60K 35/10; B60K 35/80
                (Continued)

(56) References Cited

U.S. PATENT DOCUMENTS 8,897,959 B1 * 11/2014 Sweney ................. B60K 26/02
                                                    701/36
10,377,308 B2 * 8/2019 Savaresi .................. B62J 50/22
                      (Continued)

FOREIGN PATENT DOCUMENTS

EP        2143587 A2     1/2010
EP        3335955 A1     6/2018
                (Continued)

OTHER PUBLICATIONS

International Search Report and Written Opinion for Application No. PCT/IB2022/053668 dated Jul. 15, 2022 (10 pages).

*Primary Examiner* — Andrew Joseph Rudy
(74) *Attorney, Agent, or Firm* — Michael Best & Friedrich LLP

(57)        ABSTRACT

The present invention obtains a controller and a control method for a rider assistance system capable of improving a rider's safety.

A controller (20) includes an acquisition section and an execution section. The acquisition section acquires a positional relationship information between a subject vehicle (100) and a target while the subject vehicle (100) is traveling. The target is located around the subject vehicle (100). The acquisition section acquires the positional relationship information based on a surrounding environment information relative to environment around the subject vehicle (100). The execution section executes an assistance operation, in which the rider is assisted in driving the subject vehicle (100), based on the positional relationship information acquired by the acquisition section. The execution section changes the assistance operation between a case where the subject vehicle (100) is in a group ride in which the subject vehicle (100) is traveling in a group of a plurality
                (Continued)

100 of lean vehicles including the subject vehicle (100) and a case where the subject vehicle (100) is not in the group ride.

12 Claims, 3 Drawing Sheets

(58) Field of Classification Search
USPC ........................................................... 701/36
See application file for complete search history.

(56) References Cited

U.S. PATENT DOCUMENTS

| | | | |
|---|---|---|---|
| 11,798,290 B2 * | 10/2023 | Oesterling | ............. G08G 1/166 |
| 2016/0229292 A1 | 8/2016 | Kleen et al. | |
| 2019/0129416 A1 | 5/2019 | Upmanue et al. | |
| 2023/0078629 A1 * | 3/2023 | Giraud | ................... H03K 17/96 |
| | | | 701/36 |

FOREIGN PATENT DOCUMENTS

| | | |
|---|---|---|
| JP | 2009116882 A | 5/2009 |
| WO | 2020041188 A1 | 2/2020 |

* cited by examiner

[FIG. 1]
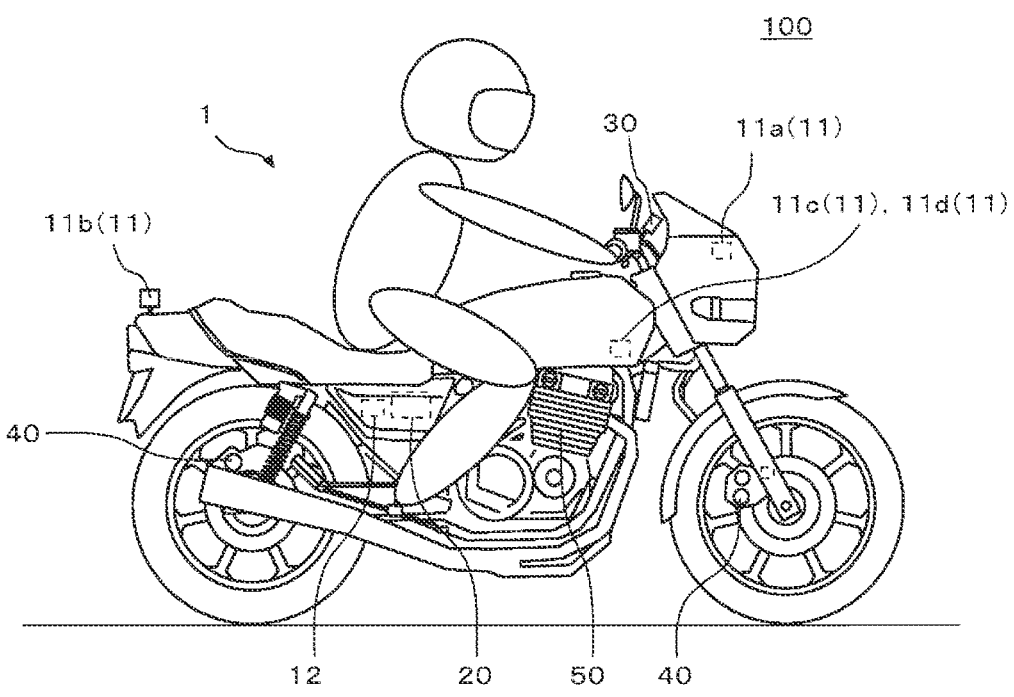
[FIG. 2]
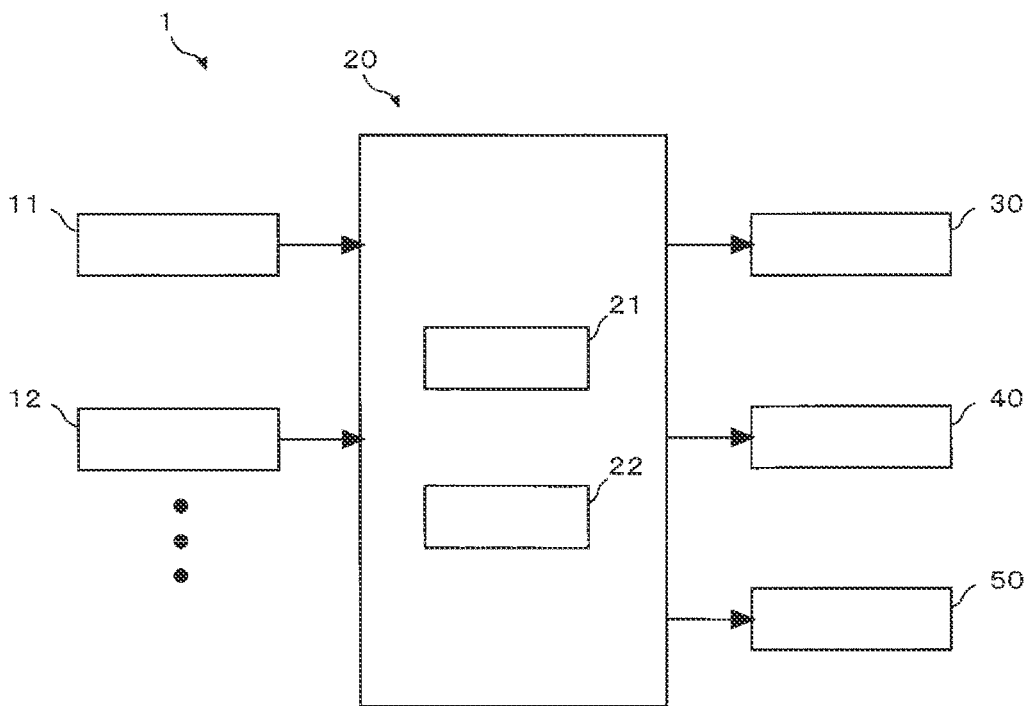

[FIG. 3]
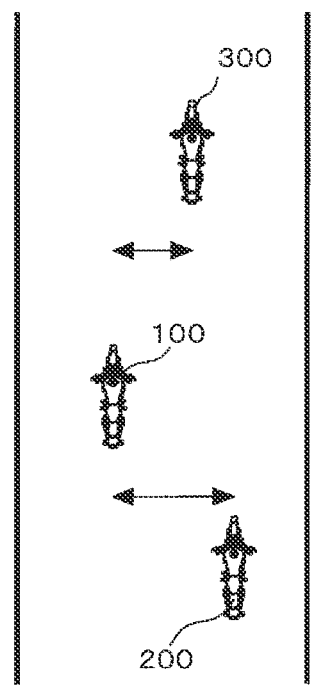
[FIG. 4]
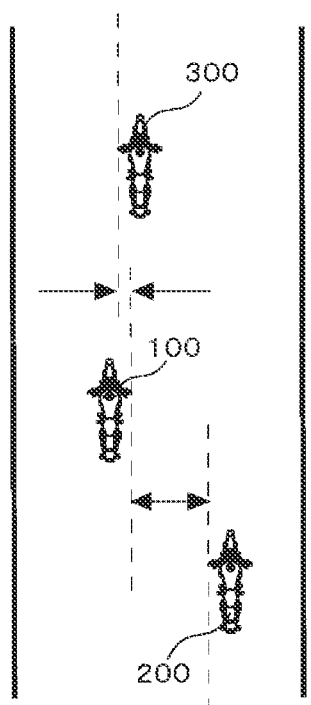

[FIG. 5]
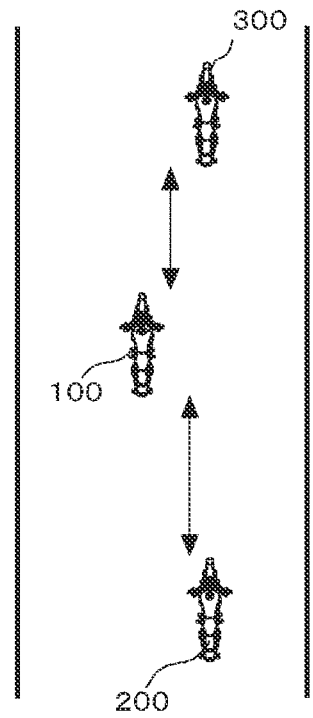
[FIG. 6]
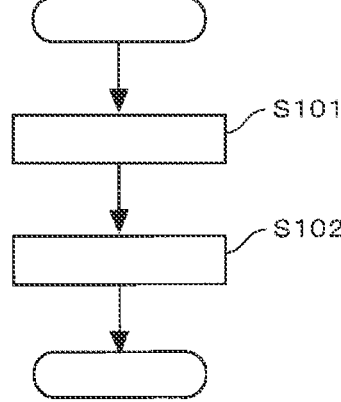

CONTROLLER AND CONTROL METHOD FOR RIDER ASSISTANCE SYSTEM

BACKGROUND OF THE INVENTION

The present invention relates to a controller for a rider assistance system that assists a rider of a lean vehicle and to a control method for a rider assistance system that assists a rider of a lean vehicle.

As a conventional rider assistance system, a rider assistance system that acquires surrounding environment information of a lean vehicle and executes an assistance operation to assist a rider in driving the lean vehicle by using the surrounding environment information has been available (for example, see JP 2009-116882 A).

The conventional rider assistance system acquires positional relationship information between the lean vehicle and a target located around the lean vehicle and executes the assistance operation based on the positional relationship information. By the way, since the lean vehicle has smaller body size than other vehicles (for example, a passenger car, a truck, and the like), the plural lean vehicles can adopt unique formation when traveling in a group. Thus, it is necessary to consider how to handle a situation where such unique formation is adopted.

SUMMARY OF THE INVENTION

The present invention has been made with the above-described issues as the background and therefore obtains a controller for a rider assistance system capable of improving a rider's safety. The present invention also obtains a control method for a rider assistance system capable of improving a rider's safety.

As one aspect of the present disclosure, a controller for a rider assistance system assists a rider of a lean vehicle. The controller includes an acquisition section and an execution section. The acquisition section acquires a positional relationship information between a subject vehicle and a target while the subject vehicle is traveling. The target is located around the subject vehicle. The acquisition section acquires the positional relationship information based on a surrounding environment information relative to environment around the subject vehicle. The execution section executes an assistance operation, in which the rider is assisted in driving the subject vehicle, based on the positional relationship information acquired by the acquisition section. The execution section changes the assistance operation between a case where the subject vehicle is in a group ride in which the subject vehicle is traveling in a group of a plurality of lean vehicles including the subject vehicle and a case where the subject vehicle is not in the group ride.

As one aspect of the present disclosure, a control method for a rider assistance system assists a rider of a lean vehicle. The control method comprising: acquiring, using an acquisition section of a controller, a positional relationship information between a subject vehicle and a target while the subject vehicle is traveling, the target located around the subject vehicle, the acquisition section configured to acquire the positional relationship information based on a surrounding environment information relative to environment around the subject vehicle; and executing, using an execution section of the controller, an assistance operation, in which the rider is assisted in driving the subject vehicle, based on the positional relationship information acquired by the acquisition section. The execution section, in executing the assistance operation, is configured to change the assistance operation between a case where the subject vehicle is in a group ride in which the subject vehicle is traveling in a group of a plurality of lean vehicles including the subject vehicle and a case where the subject vehicle is not in the group ride.

In the controller and the control method according to the present invention, the execution section of the controller changes the assistance operation between the case where the subject vehicle is in the group ride and the case where the subject vehicle is not in the group ride. Thus, it is possible to handle a situation where unique formation is adopted for the lean vehicles. Therefore, the rider's safety is improved.

BRIEF DESCRIPTION OF THE DRAWINGS

FIG. 1 is a view illustrating a mounted state of a rider assistance system according to an embodiment of the present invention to a subject vehicle.

FIG. 2 is a diagram illustrating a system configuration of the rider assistance system according to the embodiment of the present invention.

FIG. 3 is a view for explaining the configuration of the rider assistance system according to the embodiment of the present invention.

FIG. 4 is a view for explaining the configuration of the rider assistance system according to the embodiment of the present invention.

FIG. 5 is a view for explaining the configuration of the rider assistance system according to the embodiment of the present invention.

FIG. 6 is a chart illustrating an operation flow of a controller for the rider assistance system according to the embodiment of the present invention.

DETAILED DESCRIPTION

A description will hereinafter be made on a controller and a control method according to the present invention with reference to the drawings.

A configuration, operation, and the like, which will be described below, merely constitute one example. The controller and the control method according to the present invention are not limited to a case with such a configuration, such operation, and the like.

For example, a description will hereinafter be made on a case where the controller and the control method according to the present invention are used for a rider assistance system of a two-wheeled motor vehicle. However, the controller and the control method according to the present invention may be used for a rider assistance system of a lean vehicle other than the two-wheeled motor vehicle. The lean vehicle means a vehicle, a body of which is tilted to the right when turning in a right direction and is tilted to the left when turning in a left direction. Examples of the lean vehicle are motorcycles (the two-wheeled motor vehicle and a three-wheeled motor vehicle) and pedal-driven vehicles. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by a rider. Examples of the pedal-driven vehicle are a normal pedal-driven vehicle, an electrically-assisted pedal-driven vehicle, and an electric pedal-driven vehicle.

The same or similar description will appropriately be simplified or will not be made below. In the drawings, the same or similar portions will be denoted by the same reference sign or will not be denoted by a reference sign. A detailed structure will appropriately be illustrated in a simplified manner or will not be illustrated.

A description will hereinafter be made on a rider assistance system according to an embodiment.

<Configuration of Rider Assistance System>

A description will be made on a configuration of the rider assistance system according to the embodiment.

FIG. 1 is a view illustrating a mounted state of the rider assistance system according to the embodiment of the present invention to a subject vehicle. FIG. 2 is a diagram illustrating a system configuration of the rider assistance system according to the embodiment of the present invention. FIG. 3 to FIG. 5 are views for explaining the configuration of the rider assistance system according to the embodiment of the present invention.

As illustrated in FIG. 1 and FIG. 2, a rider assistance system 1 is mounted to a subject vehicle 100 as a lean vehicle. For example, the rider assistance system 1 includes a surrounding environment sensor 11, a vehicle behavior sensor 12, a controller (ECU) 20, a notification device 30, a brake system 40, and a drive system 50.

In the rider assistance system 1, the controller 20 uses information detected by the surrounding environment sensor 11 and the vehicle behavior sensor 12 to execute an assistance operation in which a rider is assisted in driving the subject vehicle 100 during travel. The controller 20 executes the assistance operation by outputting control commands to various devices (for example, the notification device 30, the brake system 40, the drive system 50, and the like). When necessary, the controller 20 receives detection results from various sensors (not illustrated) for detecting other types of information (for example, information on an operating state of the brake system 40 by the rider, information on an operating state of the drive system 50 by the rider, and the like). Each component of the rider assistance system 1 may exclusively be used for the rider assistance system 1 or may be shared with another system.

The surrounding environment sensor 11 detects a surrounding environment information which is information relative to environment surrounding the subject vehicle 100. The surrounding environment information includes information about a distance between the subject vehicle 100 and a target located around the subject vehicle 100 or an orientation of the target with respect to the subject vehicle 100. For example, the surrounding environment sensor 11 may be a surrounding environment sensor 11a that detects the surrounding environment information in front of the subject vehicle 100, may be a surrounding environment sensor 11b that detects the surrounding environment information behind the subject vehicle 100, may be a surrounding environment sensor 11c that detects the surrounding environment information on a left side of the subject vehicle 100, may be a surrounding environment sensor 11d that detects the surrounding environment information on a right side of the subject vehicle 100, or may be a combination of those. Examples of each of the surrounding environment sensors 11a, 11b, 11c, 11d are a radar, a Lidar sensor, an ultrasonic sensor, and a camera. At least a part of each of the surrounding environment sensor 11c and the surrounding environment sensor 11d may be substituted by the surrounding environment sensor 11a or the surrounding environment sensor 11b.

The vehicle behavior sensor 12 detects vehicle behavior information of the subject vehicle 100. Examples of the vehicle behavior sensor 12 are a vehicle speed sensor and an inertial measurement unit (IMU). The vehicle speed sensor detects a speed generated to the subject vehicle 100. The vehicle speed sensor may detect another physical quantity that can substantially be converted to the speed generated to the subject vehicle 100. The inertial measurement unit detects accelerations in three axes (a front-rear direction, a vehicle width direction, and a vehicle height direction) and angular velocities in the three axes (a roll angle, a pitch angle, and a yaw angle) generated to the subject vehicle 100. The inertial measurement unit may detect other physical quantities that can substantially be converted to the accelerations in three-axes and the angular velocities in three-axes generated to the subject vehicle 100. Alternatively, the inertial measurement unit may partially detect the accelerations in three-axes and the angular velocities in three-axes.

The controller 20 at least includes an acquisition section 21 and an execution section 22. The sections of the controller 20 may collectively be provided in a single casing or may separately be provided in plural casings. In addition, the controller 20 may entirely or partially be constructed of a microcomputer, a microprocessor unit, or the like, may be constructed of one whose firmware and the like can be updated, or may be a program module or the like that is executed by a command from a CPU or the like, for example.

While the subject vehicle 100 travels, the acquisition section 21 acquires positional relationship information between the subject vehicle 100 and a target (for example, another vehicle, an obstacle, a road facility, a person, an animal, or the like) located around the subject vehicle 100 based on the surrounding environment information detected by the surrounding environment sensor 11. For example, the positional relationship information is information on a relative position, a relative distance, a relative speed, a relative acceleration, a relative jerk, and the like. The positional relationship information may be information on another physical quantity that can substantially be converted to each one of those.

Based on the positional relationship information acquired by the acquisition section 21, the execution section 22 executes the assistance operation for assisting the rider in driving the subject vehicle 100 while the subject vehicle 100 during traveling. When necessary, the execution section 22 uses the vehicle behavior information, which is detected by the vehicle behavior sensor 12, to execute the assistance operation or determine whether to execute the assistance operation. The execution section 22 changes the assistance operation between a case where the subject vehicle 100 is in a group ride and a case where the subject vehicle 100 is not in the group ride. When the subject vehicle 100 is in the group ride, it means that the subject vehicle 100 is traveling in a group of lean vehicles including the subject vehicle 100. In other words, it means that the subject vehicle 100 is traveling with the lean vehicles as a team. Examples of the group ride are travel in such formation that the plural lean vehicles travel in a staggered manner in a single lane and travel in such formation that the plural lean vehicles or vehicle lines of those travel side-by-side in a lane width direction in the single lane. The execution section 22 may not differentiate the type of the group ride formation or may differentiate between the types of the group ride formation and change the assistance operation according to the differentiation. The execution section 22 may determine whether the subject vehicle 100 is in the group ride by automatic detection of a state where the plural specific lean vehicles travel in the group, which is based on the positional relationship information acquired by the acquisition section 21. For another example, the execution section 22 may determine whether the subject vehicle 100 is in the group ride by the rider's manual selection of a group ride mode or by the rider's manual approval operation after the automatic detection based on the surrounding environment information. For example, in the case where the acquisition section 21 acquires the positional relationship information indicating that a state where the other lean vehicle traveling in the same lane as the subject vehicle 100 is located at a specified position with respect to the subject vehicle 100 continues over a reference period or a reference travel distance, the execution section 22 can determine that the subject vehicle 100 is in the group ride.

The assistance operation may be a notification operation in which a warning is generated to the rider. In such a case, the execution section 22 changes the control command to be output to the notification device 30 according to whether the subject vehicle 100 is in the group ride. Alternatively, the assistance operation may be control operation to control the speed, the acceleration, or the jerk generated to the subject vehicle 100. In such a case, the execution section 22 changes the control command to be output to at least one of the brake system 40 and the drive system 50 according to whether the travel of the subject vehicle 100 is in the group ride. The control operation may be executed in a state where the rider operates the brake system 40 or the drive system 50 or may be executed in a state where the rider does not operate the brake system 40 or the drive system 50. As the assistance operation, both of the notification operation for the rider and the control operation of the speed, the acceleration, or the jerk generated to the subject vehicle 100 may be executed.

The notification device 30 may notify the rider by display (that is, a sensation through a visual organ as a sensory organ), may notify the rider by sound (that is, a sensation through an auditory organ as the sensory organ), may notify the rider by vibration (that is, a sensation through a tactile organ as the sensory organ), or may notify the rider by a combination of those. More specifically, the notification device 30 is a display, a lamp, a speaker, a vibrator, or the like, may be provided to the subject vehicle 100, or may be provided to an accessory such as a helmet or a glove associated with the subject vehicle 100. In addition, the notification device 30 may be constructed of a single output device or may be constructed of plural output devices of the same type or different types. Such plural output devices may be provided integrally or may be provided separately.

The brake system 40 is provided to brake the subject vehicle 100. The drive system 50 is used as a power source of the subject vehicle 100 and generates drive power for the subject vehicle 100. The drive system 50 may take on the function of the brake system 40.

As an example, the execution section 22 executes, as the assistance operation, the notification operation notifies the rider of a possibility of collision that may occur between the subject vehicle 100 and the target located around the subject vehicle 100. For example, in the case where the acquisition section 21 acquires the positional relationship information corresponding to a state where the collision possibility of the target located in front of, behind, or on a side of the subject vehicle 100 with the subject vehicle 100 exceeds a threshold value, the execution section 22 executes the notification operation for the rider. In such notification operation, presence or absence of the collision possibility may be notified, or a rank indicating a degree of the collision possibility may be notified. Alternatively, in addition to the above, additional information such as a type of the target may be notified. The execution section 22 changes the notification operation according to whether the subject vehicle 100 is in the group ride. The execution section 22 may execute, as the assistance operation, the control operation of the speed, the acceleration, or the jerk generated to the subject vehicle 100 so as to reduce the collision possibility. Also, in such a case, the execution section 22 changes the control operation according to whether the subject vehicle 100 is in the group ride.

As an example, the execution section 22 executes, as the assistance operation, the notification operation that notifies the rider of a relative distance or a passing time difference between the subject vehicle 100 and the other vehicle located around the subject vehicle 100. For example, the acquisition section 21 acquires, as the positional relationship information, information on the relative distance of the other vehicle traveling in front of, behind, or on the side of the subject vehicle 100 to the subject vehicle 100 or information on the passing time difference of the other vehicle from the subject vehicle 100. Then, the execution section 22 executes the notification operation that notifies the rider of the information on the relative distance or the passing time difference. In such notification operation, the relative distance or the passing time difference itself may be notified, or a rank indicating a degree of the relative distance or the passing time difference may be notified. Alternatively, in addition to the above, for example, additional information such as a model of the other vehicle may be notified. The execution section 22 changes the notification operation according to whether the subject vehicle 100 is in the group ride. The execution section 22 may execute, as the assistance operation, the control operation of the speed, the acceleration, or the jerk generated to the subject vehicle 100 so as to adjust the relative distance or the passing time difference. Also, in such a case, the execution section 22 changes the control operation according to whether the subject vehicle 100 is in the group ride.

As an example, the execution section 22 executes, as the assistance operation, the notification operation that notifies the rider that the other vehicle located around the subject vehicle 100 tailgates the subject vehicle 100. For example, in the case where the acquisition section 21 acquires the positional relationship information corresponding to a state where the other vehicle travels behind the subject vehicle 100 with the relative distance or the passing time difference falling below a threshold value and where such a relative distance or a passing time difference remains stable over a reference period, the execution section 22 executes the notification operation for the rider. In such notification operation, presence or absence of tailgating may be notified, or a state thereof (for example, the relative distance or the rank indicating the degree of the relative distance, the passing time difference or the rank indicating the degree of the passing time difference, the model of the other vehicle, and the like) may be notified. The execution section 22 changes the notification operation according to whether the subject vehicle 100 is in the group ride. The execution section 22 may execute, as the assistance operation, the control operation of the speed, the acceleration, or the jerk generated to the subject vehicle 100 so as to adjust the relative distance or the passing time difference. Also, in such a case, the execution section 22 changes the control operation according to whether the subject vehicle 100 is in the group ride.

As an example, the execution section 22 executes, as the assistance operation, the notification operation that notifies the rider that the other vehicle located around the subject vehicle 100 travels in a blind spot of the subject vehicle 100. For example, in the case where the acquisition section 21 acquires the positional relationship information corresponding to a state where the other vehicle travels in a possibly blind area by the rider on the side of the subject vehicle 100 while having the relative distance falling below the threshold value, the execution section 22 executes the notification operation for the rider. In such notification operation, presence or absence of the other vehicle traveling in the blind spot of the subject vehicle 100 may be notified, or a state thereof (for example, the relative distance or the rank indicating the degree of the relative distance, the relative speed or the rank indicating the degree of the relative speed, the model of the other vehicle, and the like) may be notified. The execution section 22 changes the notification operation according to whether the subject vehicle 100 is in the group ride.

The execution section 22 permits the execution of the assistance operation when the subject vehicle 100 is not in the group ride and forbids the execution of the assistance operation when the subject vehicle 100 is in the group ride. The execution section 22 may no longer execute the assistance operation itself or may forbid the execution of the assistance operation by narrowing or shifting a detection range of the surrounding environment sensor 11 or a processing operation range, within which the acquisition section 21 acquires the positional relationship information, in a state where the execution section 22 can execute the assistance operation. For example, when determining that the subject vehicle 100 is in the group ride, the execution section 22 narrows or shifts the detection range or the processing operation range so as not to include the other lean vehicle traveling in the same group as the subject vehicle 100.

The execution section 22 executes the assistance operation so that a degree of assistance becomes a first degree when the subject vehicle 100 is in the group ride. The execution section 22 executes the assistance operation so that the degree of assistance becomes a second degree, which is higher than the first degree, when the subject vehicle 100 is not in the group ride. For example, the execution section 22 may lower the degree of assistance by changing a control parameter used in the assistance operation. For example, the execution section 22 may lower the degree of the assistance without changing the control parameter. Specifically, the execution section 22 may lower the degree of the assistance by narrowing or shifting the detection range of the surrounding environment sensor 11. The execution section 22 also may lower the degree of the assistance by narrowing or shifting the processing operation range within which the acquisition section 21 acquires the positional relationship information. For example, when it is determined that the subject vehicle 100 is in the group ride, the execution section 22 narrows or shifts the detection range or the processing operation range such that the other lean vehicles traveling in the same group as the subject vehicle 100 is less likely to be included in such a range.

For example, in the case where the assistance operation is the notification operation for the rider, or in the case where the assistance operation is the control operation of the speed, the acceleration, or the jerk generated to the subject vehicle 100, the execution section 22 suppresses the degree of the assistance in the assistance operation by delaying initiation timing of the assistance operation. The execution section 22 may delay the initiation timing of the assistance operation by providing or extending a time delay between decision to execute the assistance operation and the actual execution thereof, or may delay the initiation timing of the assistance operation by changing a threshold value (for example, the collision possibility, the relative distance, the passing time difference, an operation amount of the braking system 40 by the rider, or the like) serving as an initiation criterion of the assistance operation to a value with which it is difficult to satisfy the initiation criterion of the assistance operation.

For example, in the case where the assistance operation is the notification operation for the rider, the execution section 22 suppresses the degree of the assistance in the assistance operation by reducing the rider's perceptibility of the notification. The execution section 22 may reduce the rider's perceptibility of the notification by reducing intensity of the notification (for example, brightness of the display, size of the display, volume of the sound, an amplitude of the vibration, or the like), or may reduce the rider's perceptibility of the notification by reducing a frequency of the notification (for example, a frequency of a display change, a frequency of a volume change, a frequency of the vibration, or the like). Alternatively, the execution section 22 may reduce the rider's perceptibility of the notification by switching a type of the notification to one that is less likely to be perceived by the rider. For example, the notification for the rider by the vibration may be switched to the notification for the rider by the display or the sound. Further alternatively, the execution section 22 may reduce the rider's perceptibility of the notification by switching the notification device 30 to one, notification by which is less likely to be perceived by the rider. For example, the notification by the display or the sound using the notification device 30 provided to the helmet may be switched to the notification by the display or the sound using the notification device 30 provided to the subject vehicle 100.

For example, in the case where the assistance operation is the control operation of the speed, the acceleration, or the jerk generated to the subject vehicle 100, the execution section 22 suppresses the degree of the assistance in the assistance operation by reducing a change amount of the speed, the acceleration, or the jerk. The execution section 22 may change a target speed set in the control operation to be close to the vehicle speed of the subject vehicle 100, may reduce an absolute value of target acceleration set in the control operation or an upper limit of the absolute value of the target acceleration, may reduce the absolute value of the target acceleration or an absolute value of a target jerk set in the control operation for an entire period of the control operation, or, immediately after initiation of the control operation, may reduce the absolute value of the target acceleration or the absolute value of the target jerk set in the control operation and then gradually increase the absolute value. For example, the execution section 22 preferably change the change amount according to a degree of the collision possibility between the subject vehicle 100 and the target (the other lean vehicle traveling in the same group as the subject vehicle 100 herein), the degree of the relative distance of the other vehicle (the other lean vehicle traveling in the same group as the subject vehicle 100 herein) to the subject vehicle 100, the degree of the passing time difference of the other vehicle (the other lean vehicle traveling in the same group as the subject vehicle 100 herein) from the subject vehicle 100, or the like.

For example, the execution section 22 may determine whether to lower an amount of change in the speed, the acceleration or the jerk based on a situation in front of and/or behind the subject vehicle 100 when the assistance operation is a control operation to decelerate the subject vehicle 100 and it is determined that the subject vehicle 100 is in the group ride. For example, the execution section 22 may determine whether to lower an amount of change in the speed, the acceleration or the jerk based on a situation in front of and/or behind the subject vehicle 100 when the assistance operation is a control operation to accelerate the subject vehicle 100 and it is determined that the subject vehicle 100 is in the group ride. Instead of determining whether to reduce the amount of change in the speed, the acceleration or the jerk, the execution section 22 may determine whether to maintain or reduce a degree of lowering the amount of change. The execution section 22 may determine whether to execute a control operation, as the assistance operation, to decelerate the subject vehicle 100 based on the situation in front of and/or behind the subject vehicle 100, regardless of whether the subject vehicle 100 is in the group ride. The execution section 22 may determine whether to execute a control operation, as the assistance operation, to accelerate the subject vehicle 100 based on the situation in front of and/or behind the subject vehicle 100, regardless of whether the subject vehicle 100 is in the group ride. The execution section 22 may set the degree of deceleration and/or acceleration based on the situation in front of and/or behind the subject vehicle 100, regardless of whether the subject vehicle 100 is in the group ride.

As illustrated in FIG. 3 and FIG. 4, for example, in the case where the assistance operation is the control operation to decelerate the subject vehicle 100, the execution section 22 does not reduce the change amount of the speed, the acceleration, or the jerk in a situation where the subject vehicle 100 is away from another lean vehicle 200, which is located behind the subject vehicle 100, in the lane width direction or the vehicle width direction. In addition, for example, in the case where the assistance operation is the control operation to decelerate the subject vehicle 100, the execution section 22 does not reduce the change amount of the speed, the acceleration, or the jerk in a situation where the subject vehicle 100 is located near another lean vehicle 300, which is located in front of the subject vehicle 100, in the lane width direction or the vehicle width direction. Furthermore, for example, in the case where the assistance operation is the control operation to accelerate the subject vehicle 100, the execution section 22 does not reduce the change amount of the speed, the acceleration, or the jerk in a situation where the subject vehicle 100 is located near the other lean vehicle 200, which is located behind the subject vehicle 100, in the lane width direction or the vehicle width direction. Moreover, for example, in the case where the assistance operation is the control operation to accelerate the subject vehicle 100, the execution section 22 does not reduce the change amount of the speed, the acceleration, or the jerk in a situation where the subject vehicle 100 is away from the other lean vehicle 300, which is located in front of the subject vehicle 100, in the lane width direction or the vehicle width direction. As illustrated in FIG. 3, whether the subject vehicle 100 is away from or is located near the other lean vehicles 200, 300 in the lane width direction or the vehicle width direction may be determined by comparing, to a reference value, a relative distance in the lane width direction or the vehicle width direction between a vehicle width center line or a swept path (the swept path in the past, at the present time, or in the future) of the subject vehicle 100 and a vehicle width center line or a swept path (the swept path in the past, at the present time, or in the future) of each of the other lean vehicles 200, 300. In addition, as illustrated in FIG. 4, whether the subject vehicle 100 is away from or is located near the other lean vehicles 200, 300 in the lane width direction or the vehicle width direction may be determined by comparing, to a reference value, a degree of overlapping between a trajectory of a line passing an end in the vehicle width direction of the subject vehicle 100 and extending in a body front-rear direction or a trajectory of such an end (the trajectory in the past, at the present time, or in the future) and a trajectory of a line passing an end in the vehicle width direction of each of the other lean vehicles 200, 300 and extending in the body front-rear direction or a trajectory of such an end (the trajectory in the past, at the present time, or in the future). At the time, an increase in a vehicle width of each of the subject vehicle 100 and/or each of the other lean vehicles 200, 300, which is associated with an increase in tilting thereof, is preferably taken into consideration.

The following examples are based on FIG. 5. For example, the execution section 22 does not reduce the amount of change in the speed, the acceleration or the jerk when (i) the assistance operation is the control operation that decelerates the subject vehicle 100 and (ii) the subject vehicle 100 is away from another vehicle 200, which is located behind the subject vehicle 100, in a direction along which the travel lane extends or in a front-rear direction of the subject vehicle 100. For example, the execution section 22 does not reduce the amount of change in the speed, the acceleration or the jerk when (i) the assistance operation is the control operation that decelerates the subject vehicle 100 and (ii) the subject vehicle 100 is approaching another vehicle 300, which is located in front of the subject vehicle 100, in a direction along which the travel lane extends or in a front-rear direction of the subject vehicle 100. For example, the execution section 22 does not reduce the amount of change in the speed, the acceleration or the jerk when (i) the assistance operation is the control operation that accelerates the subject vehicle 100 and (ii) the subject vehicle 100 is close to the other vehicle 200 in the direction along which the travel lane extends or in the front-rear direction of the subject vehicle 100. For example, the execution section 22 does not reduce the amount of change in the speed, the acceleration or the jerk when (i) the assistance operation is the control operation that accelerates the subject vehicle 100 and (ii) the subject vehicle 100 is away from the other vehicle 300 in the direction along which the travel lane extends or in the front-rear direction of the subject vehicle 100. In the above-described examples, the execution section 22 determines whether to reduce the amount of change in the speed, the acceleration or the jerk based on the distance between the subject vehicle 100 and the other vehicle 200 or 300 in the direction along the travel lane extends or the front-rear direction of the subject vehicle 100. However, the execution section 22 may determine whether to reduce the amount of change in the speed, the acceleration or the jerk based on a straight distance between the subject vehicle 100 and the other vehicle 200 or 300. For another example, the execution section 22 may determine whether to reduce the amount of change in the speed, the acceleration or the jerk based on information about whether the assistance operation is executed or based on information relating to executing the assistance operation. The assistance operation includes a notification operation that notifies the rider of a possibility of collision between the subject vehicle 100 and the target near the subject vehicle 100. The assistance operation includes a notification operation that notifies the rider of a relative distance or a passing time difference between the subject vehicle 100 and the other vehicle. The assistance operation includes a notification operation that notifies the rider of the other vehicle tailgating the subject vehicle 100 aggressively. The assistance operation includes a notification operation that notifies the rider of the other vehicle located in a blind spot of the subject vehicle 100.

<Operation of Rider Assistance System>

A description will be made on operation of the rider assistance system according to the embodiment.

FIG. 6 is a chart illustrating an operation flow of the controller in the rider assistance system according to the embodiment of the present invention.

The controller 20 executes the operation flow illustrated in FIG. 6 while the subject vehicle 100 is traveling.

(Acquisition Step)

In step S101, while the subject vehicle 100 is traveling, the acquisition section 21 acquires the positional relationship information between the subject vehicle 100 and the target located around the subject vehicle 100 based on the surrounding environment information of the subject vehicle 100.

(Execution Step)

In step S102, the execution section 22 executes the assistance operation for assisting the rider in driving the subject vehicle 100 during traveling based on the positional relationship information acquired by the acquisition section 21. Then, the execution section 22 changes the assistance operation according to whether the subject vehicle 100 is in the group ride in which the lean vehicles are traveling in the group.

<Effects of Rider Assistance System>

A description will be made on effects of the rider assistance system according to the embodiment.

The controller 20 includes: the acquisition section 21 that acquires, while the subject vehicle 100 is traveling, the positional relationship information between the subject vehicle 100 and the target located around the subject vehicle 100 based on the surrounding environment information of the subject vehicle 100; and the execution section 22 that executes the assistance operation for assisting the rider in driving the subject vehicle 100 during traveling based on the positional relationship information acquired by the acquisition section 21. The execution section 22 changes the assistance operation between the case where the subject vehicle 100 is traveling in the group ride where the subject vehicle 100 is traveling in a group of the lean vehicles including the subject vehicle 100 and the case where the subject vehicle 100 is not in the group ride. Thus, it is possible to handle the situation where the unique formation is adopted for the lean vehicles. Therefore, the rider's safety is improved.

Preferably, the execution section 22 permits executing the assistance operation when the subject vehicle 100 is not the group ride, and forbids executing the assistance operation when the subject vehicle 100 is in the group ride. With such a configuration, the rider's safety is reliably improved.

Preferably, the execution section 22 executes the assistance operation at a first degree when the subject vehicle 100 is in the group ride and executes the assistance operation at a second degree, which is higher than the first degree, when the subject vehicle 100 is not in the group ride. With such a configuration, the rider's safety is reliably improved.

Although the description has been made so far on the embodiment, only a part of the embodiment may be implemented, or a part of the embodiment may be modified to another aspect. In other words, the present invention is not limited to the embodiment that has been described.

For example, the description has been made so far on the case where the acquisition section 21 acquires the positional relationship information between the subject vehicle 100 and the target located around the subject vehicle 100 based on the surrounding environment information acquired by the surrounding environment sensor 11. However, the acquisition section 21 may acquire the positional relationship information between the subject vehicle 100 and the target located around the subject vehicle 100 by using another means (for example, wireless communication between the subject vehicle 100 and the target located therearound, wireless communication between the subject vehicle 100 and an infrastructure facility located therearound, or the like).

REFERENCE SIGNS LIST

1: Rider assistance system
11: Surrounding environment sensor
12: Vehicle behavior sensor
20: Controller
21: Acquisition section
22: Execution section
30: Notification device
40: Brake system
50: Drive system
100: Subject vehicle
200, 300: Another lean vehicle

The invention claimed is:

1. A controller (20) for a rider assistance system (1), the controller (20) configured to:
   acquire a positional relationship information between a subject vehicle (100) and a target while the subject vehicle (100) is traveling, the target located around the subject vehicle (100), based on a surrounding environment information relative to environment around the subject vehicle (100);
   execute an assistance operation, in which the rider is assisted in driving the subject vehicle (100), based on the positional relationship information acquired by the controller (20), and
   change the assistance operation between a case where the subject vehicle (100) is in a group ride in which the subject vehicle (100) is traveling in a group of a plurality of lean vehicles including the subject vehicle (100) and a case where the subject vehicle (100) is not in the group ride, the controller (20) is further configured to execute the assistance operation:
   at a first degree of assistance when the subject vehicle (100) is in the group ride; and
   at a second degree of assistance, which is higher than the first degree of assistance, when the subject vehicle (100) is not in the group ride, wherein
   the assistance operation includes a notification operation in which a warning is generated to the rider, and
   the controller (20) is configured to assist the rider to have a lower degree of perception to lower the first degree of assistance of the assistance operation performed when the subject vehicle (100) is in the group ride as compared to the second degree of assistance of the assistance operation performed when the subject vehicle (100) is not in the group ride.

2. The controller (20) according to claim 1, wherein the controller permits executing the assistance operation when the subject vehicle (100) is in the group ride and forbids executing the assistance operation when the subject vehicle (100) is not in the group ride.

3. The controller (20) according to claim 1, further configured to delay an initiation timing of the assistance operation to lower the first degree of the assistance operation performed when the subject vehicle (100) is in the group ride as compared to the second degree of the assistance operation performed when the subject vehicle (100) is not in the group ride.

4. The controller (20) according to claim 1, wherein the notification operation includes an operation that notifies the rider of a possibility of collision occurring between the subject vehicle (100) and the target.

5. The controller (20) according to claim 1, wherein the target is another vehicle, and
the notification operation includes an operation that notifies the rider of a relative distance or a passing time difference between the other vehicle and the subject vehicle (100).

6. The controller (20) according to claim 1, wherein the target it another vehicle, and
the notification operation includes an operation that notifies the rider of the other vehicle tailgating the subject vehicle (100) aggressively.

7. The controller (20) according to claim 1, wherein the target is another vehicle, and
the notification operation includes an operation that notifies the rider that the other vehicle is located in a blind spot of the subject vehicle (100).

8. The controller (20) according to claim 1, wherein the assistance operation includes a control operation in which a speed, an acceleration or a jerk generated in the subject vehicle (100) is controlled.

9. The controller (20) according to claim 1, wherein the assistance operation includes a control operation in which a speed, an acceleration or a jerk generated to the subject vehicle (100) is controlled, and
the controller is configured to decrease a degree of change in the speed, the acceleration or the jerk to lower the first degree of the assistance operation performed when the subject vehicle (100) is in the group ride as compared to the second degree of the assistance operation performed when the subject vehicle (100) is not in the group ride.

10. The controller (20) according to claim 8, wherein the control operation includes an operation that reduces a possibility of collision between the subject vehicle (100) and the target.

11. The controller (20) according to claim 8, wherein the target is another vehicle, and
the control operation includes an operation that adjusts a relative distance or a passing time difference of the other vehicle with respect to the subject vehicle (100).

12. A control method for a rider assistance system (1) that is configured to assist a rider of a lean vehicle, the control method comprising:
acquiring (S101), using a controller (20), a positional relationship information between a subject vehicle (100) and a target while the subject vehicle (100) is traveling, the target located around the subject vehicle (100), the controller (20) configured to acquire the positional relationship information based on a surrounding environment information relative to environment around the subject vehicle (100);
executing (S102), using the controller (20), an assistance operation, in which the rider is assisted in driving the subject vehicle (100), based on the positional relationship information acquired by the controller (20), and
in executing (S102) the assistance operation, change the assistance operation between a case where the subject vehicle (100) is in a group ride in which the subject vehicle (100) is traveling in a group of a plurality of lean vehicles including the subject vehicle (100) and a case where the subject vehicle (100) is not in the group ride,
executing the assistance operation at a first degree when the subject vehicle (100) is in the group ride,
executing the assistance operation at a second degree, which is higher than the first degree, when the subject vehicle (100) is not in the group ride, wherein the assistance operation includes a notification operation in which a warning is generated to the rider, and
lowering the degree of perception of the rider to lower the first degree of the assistance operation performed when the subject vehicle (100) is in the group ride as compared to the second degree of the assistance operation performed when the subject vehicle (100) is not in the group ride.

* * * * *